United States Patent
Marmonier et al.

[11] Patent Number: 5,910,872
[45] Date of Patent: Jun. 8, 1999

[54] METHOD OF DISCRIMINATING BETWEEN AN INTERNAL ARC AND AN INTERRUPTION ARC DETECTED INSIDE A METAL-CLAD ELECTRICAL INSTALLATION

[75] Inventors: Jean Marmonier; Jean-François Penning, both of Aix Les Bains, France

[73] Assignee: Gec Alsthom T & D SA, Paris, France

[21] Appl. No.: 08/990,435

[22] Filed: Dec. 15, 1997

[30] Foreign Application Priority Data

Dec. 16, 1996 [FR] France .................................. 96 15427

[51] Int. Cl.$^6$ ...................................................... H02H 3/00
[52] U.S. Cl. .................................... 361/2; 361/42; 361/78
[58] Field of Search ............................... 361/2, 5, 14, 42, 361/45, 78, 87, 80, 83, 88, 93, 94, 96; 324/512, 522, 536, 535; 702/58, 59, 79, 88, 149, 176, 179, 182, 187

[56] References Cited

U.S. PATENT DOCUMENTS

| | | | |
|---|---|---|---|
| 3,887,915 | 6/1975 | Olsen et al. . | |
| 4,670,812 | 6/1987 | Doefler et al. | 361/83 |
| 4,688,136 | 8/1987 | Yamauchi | 361/120 |
| 4,695,913 | 9/1987 | Terracol et al. | 361/13 |
| 4,791,518 | 12/1988 | Fischer . | |
| 4,878,144 | 10/1989 | Nebon . | |
| 4,897,755 | 1/1990 | Polster et al. | 361/2 |
| 5,185,684 | 2/1993 | Beihoff et al. . | |
| 5,604,437 | 2/1997 | Moncorge et al. | 324/424 |
| 5,611,899 | 3/1997 | Maass | 204/298.08 |

FOREIGN PATENT DOCUMENTS

| | | |
|---|---|---|
| 0103921A1 | 3/1984 | European Pat. Off. . |
| 4226234A1 | 2/1994 | Germany . |
| 19504731C1 | 8/1996 | Germany . |
| 19508763 | 9/1996 | Germany . |

OTHER PUBLICATIONS

I. Takagi eet al, "Application of Gas Pressure Sensor for Fault Location System in Gas Insulated Substation" *IEEE Transactions on Power Delivery*, vol. 10, No. 4, Oct. 1995, NY< US, pp. 1806–1814.

*Primary Examiner*—Richard T. Elms
*Assistant Examiner*—Kim Huynh
*Attorney, Agent, or Firm*—Sughrue, Mion, Zinn Macpeak & Seas, PLLC

[57] ABSTRACT

A method of discriminating an arc detected in metal-clad equipment includes detecting an arc, generating an arc-appearance signal, transmitting the arc-appearance signal to a computer, and determining a time lapse T. The time lapse T is determined according to the formula $t_o - t_a$; $t_o$ is an instant at which the computer receives a circuit breaker trigger order, and $t_a$ is an instant at which the arc-appearance signal is first acquired by the computer. The arc is determined to be an internal arc (1) if the time lapse T is positive, or (2) if the time lapse T is negative and its absolute value is less than or equal to 10 ms. On the other hand, if the time lapse T is negative and its absolute value is greater than 10 ms, variation of the arc-appearance signal is analyzed to discriminate the arc.

6 Claims, 4 Drawing Sheets

METHOD OF DISCRIMINATING BETWEEN AN INTERNAL ARC AND AN INTERRUPTION ARC DETECTED INSIDE A METAL-CLAD ELECTRICAL INSTALLATION

The present invention relates to a method of discriminating between an internal arc and an interruption arc detected inside a high or medium voltage electrical installation in a metal case or "cladding".

BACKGROUND OF THE INVENTION

In electrical equipment, and in particular in metal-clad equipment, including at least one set of bus bars and a circuit breaker, and fitted in conventional manner with a protective system and a computer, it is known to use a sensor to detect the appearance of an arc between a conductor and the metal case (or between conductors in a three-phase installation) where such an arc is said to be "internal". The sensor may be a pressure detector or a light detector. Such devices are described in patents EP-0 197 778 and EP-0 313 422.

Nevertheless, while the contacts of the circuit breaker are interrupting a load current or a fault current, the arc which is struck between its contacts, referred to as the "interruption" arc, has characteristics that are similar to those of an internal arc. The increase in light or pressure while interrupting a high short circuit current is close to that created during the appearance of a quickly eliminated internal arc with a low short circuit current.

This makes distinguishing between an internal arc and an interruption arc uncertain when it is performed merely by measuring an increase in pressure or of light.

OBJECTS AND SUMMARY OF THE INVENTION

The invention solves this problem and provides a method of discriminating between an internal arc and an interruption arc detected in metal-clad equipment including at least one set of bus bars and a circuit breaker, and fitted with a protective system and a computer.

In conventional manner, such equipment is fitted with a protective system constituted by electronic facilities for analyzing voltage and/or current. The protective system detects a fault and transmits a trigger order both to the trigger facility of the circuit breaker and to the computer. In the trigger facility, an electromagnetic coil for opening the circuit breaker, is put into operation so that its electromagnet actuates the device for driving the contacts of the circuit breaker. The time interval between an arc appearing and the trigger order being acquired by the computer lies typically in the range 5 ms to 20 ms, 5 ms applying to so-called "fast" protection and 20 ms to so-called "slow" protection.

The method of the invention consists in detecting the appearance of an arc by means of a sensor that generates an arc-appearance signal, in transmitting said signal to the computer, and in determining the time lapse $T = t_o - t_a$ between the instant $t_o$ at which a circuit breaker trigger order is received as transmitted to the computer by the protective system, and the instant $t_a$ at which said signal begins to be acquired by the computer.

According to a first characteristic, if the time lapse T is positive, then the arc is determined as being an internal arc.

According to a second characteristic, if the time lapse T is negative and its absolute value is less than or equal to 10 ms, then the arc is determined as being an internal arc.

According to a third characteristic, if the time lapse T is negative and its absolute value is greater than 10 ms, variation of the arc-appearance signal is analyzed.

In which case, if the signal presents a break point within 500 ms following the start of acquisition thereof, then the arc is determined as being an internal arc and if the signal does not have a break point within 500 ms following the beginning of its acquisition, then the arc is determined as being an interruption arc.

The invention also provides another method of discriminating between an internal arc and an interruption arc detected inside metal-clad equipment including at least one set of bus bars and a closed circuit breaker, and fitted with a protective system and a computer, which method is designed to be associated with the above method.

The second method consists in detecting the appearance of an arc by means of a sensor generating an arc-existence signal, in transmitting said signal to the computer, and in determining whether the duration of the signal is less than or greater than a predetermined limit value.

Advantageously, said limit value lies between the measurable duration $T_1$ of an interruption arc and the measurable time lapse $T_2$ between the appearance of an internal arc and elimination thereof by the circuit breaker opening, the arc being determined as being an interruption arc if the duration of the signal is less than said limit value and the arc being determined as being an internal arc if the duration of the signal is greater than said limit value.

In practice, and preferably, said limit value is about 50 ms.

BRIEF DESCRIPTION OF THE DRAWINGS

The invention is described below in greater detail with reference to the figures which show a preferred embodiment only of the invention.

MORE DETAILED DESCRIPTION

Figure 1A:
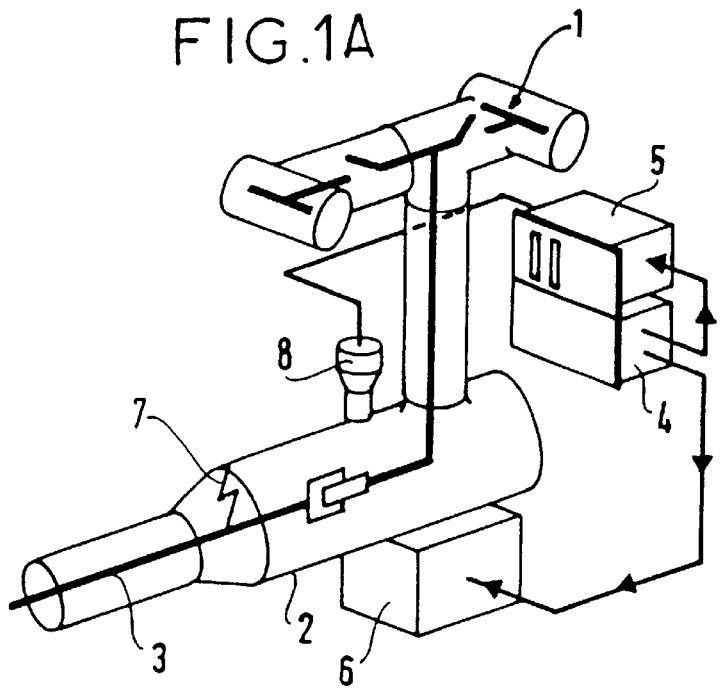
FIG. 1A is a perspective view of metal clad equipment with an internal arc occurring in a circuit breaker.

As shown in FIG. 1A, metal-clad equipment includes a set of bus bars 1 and a circuit breaker 2 connected to an outgoing feeder 3. It is fitted with a protective system 4 and with a computer 5.

The protective system 4 is constituted by electronic facilities for analyzing voltage and/or current. When it detects a fault current, it transmits a trigger order both to the trigger facility 6 of the circuit breaker 2 and to the computer 5. An electromagnetic coil in the trigger facility 6 is put into operation to open the circuit breaker, and the electromagnet thereof actuates the device for driving the contacts of the circuit breaker. The time interval between the appearance of the fault, in this case an internal arc 7 inside the circuit breaker, and acquisition of the trigger order by the computer typically lies in the range 5 ms to 20 ms, with 5 ms applying to the case of so-called "fast" protection, and 20 ms to the case of so-called "slow" protection.

Figure 4:
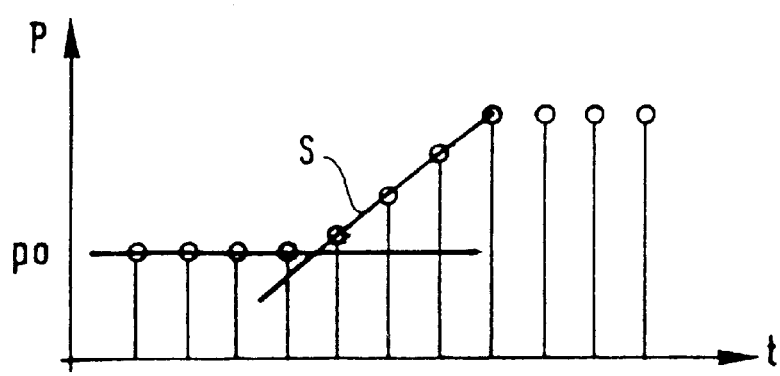
FIG. 4 is a timing chart of a computer's periodic registration of pressure data.

The circuit breaker 2 is fitted with a sensor 8, in this case a pressure sensor, for the purpose of detecting the existence of an internal arc inside the installation. The pressure sensor 8 is designed to transmit the pressure that obtains inside the circuit breaker 2 to the computer 5 which registers this pressure data by taking samples at a certain rate, e.g. every 20 ms, as shown in FIG. 4. When the pressure data is significantly greater than the normal pressure $p_0$, and increases in substantially linear manner, an arc is detected and the pressure rise signal s constituted by the data is called an "arc-existence" signal. It is possible to deduce therefrom the instant at which the pressure rise started, e.g. from three pressure samples greater than the normal pressure. This detected start of the pressure rise front is referred to as the start of signal acquisition.

Figure 1B:
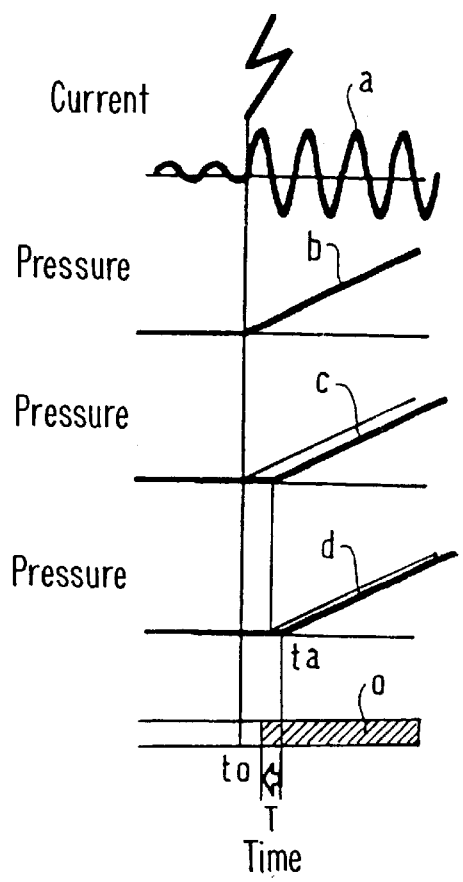
FIG. 1B is a time line showing the relevant timing between arc detection and circuit breaker triggering, thereby defining a negative time delay according to an embodiment of the present invention.
Figure 1C:
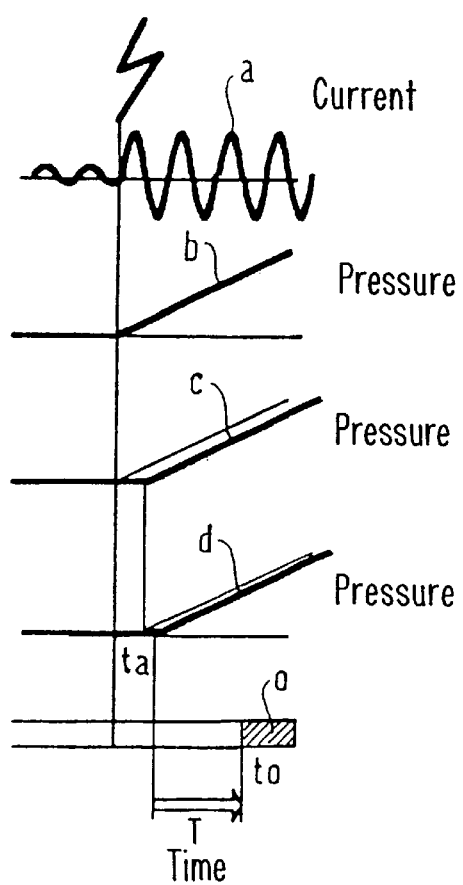
FIG. 1C is a time line showing the relevant timing between arc detection and circuit breaker triggering, thereby defining a positive time delay according to an embodiment of the present invention.

FIGS. 1B and 1C illustrate the process of arc detection and of circuit breaker triggering as a function of time.

The internal arc 7 creates a fault current a and an increase in pressure b. The increase in pressure propagates through the $SF_6$, approximately at the speed of sound, i.e. 150 meters per second (m/s), and it is detected by the sensor 8 after a first delay that corresponds to the distance between the arc 7 and the sensor 8. This first delay is shown at c.

The pressure rise front is then transmitted at instant $t_a$ to the computer 5 after a relatively small second delay due firstly to the characteristics of the sensor 8, and secondly to the acquisition system of the computer 5. This second delay is shown at d.

During this time, the protective system 4 detects the fault current and transmits the circuit breaker trigger order o to the computer 5 at instant $t_o$. FIG. 1B shows fast protection where $T=t_o-t_a$ is negative and less than or equal to 10 ms in absolute value, while FIG. 1C shows slow protection where $T=t_o-t_a$ is positive.

The appearance of an internal arc will be followed by the contacts separating and an interruption arc being struck between them. The resulting pressure increase will be of no consequence since the decision criteria have already been established.

Figure 2A:
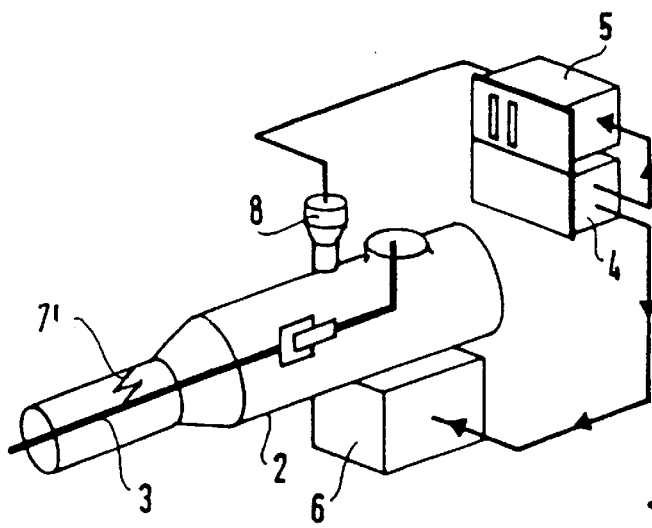
FIG. 2A is a perspective view of metal clad equipment with an internal arc occurring outside of a circuit breaker.
Figure 2B:
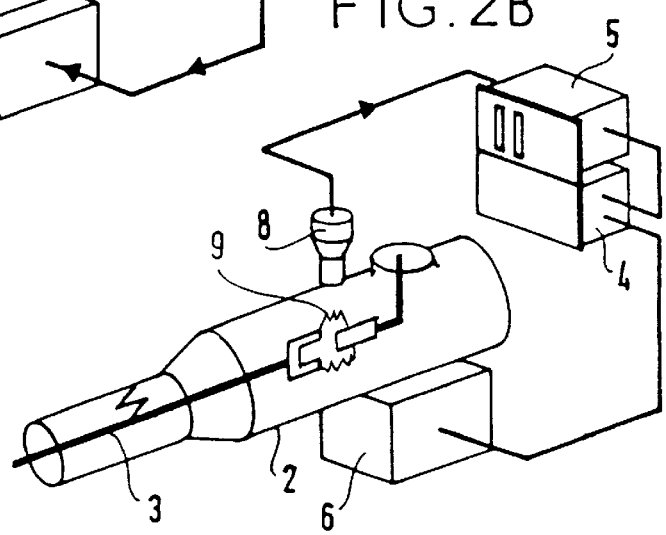
FIG. 2B is a perspective view of metal clad equipment with an internal arc occurring outside of a circuit breaker and an interruption arc.
Figure 2C:
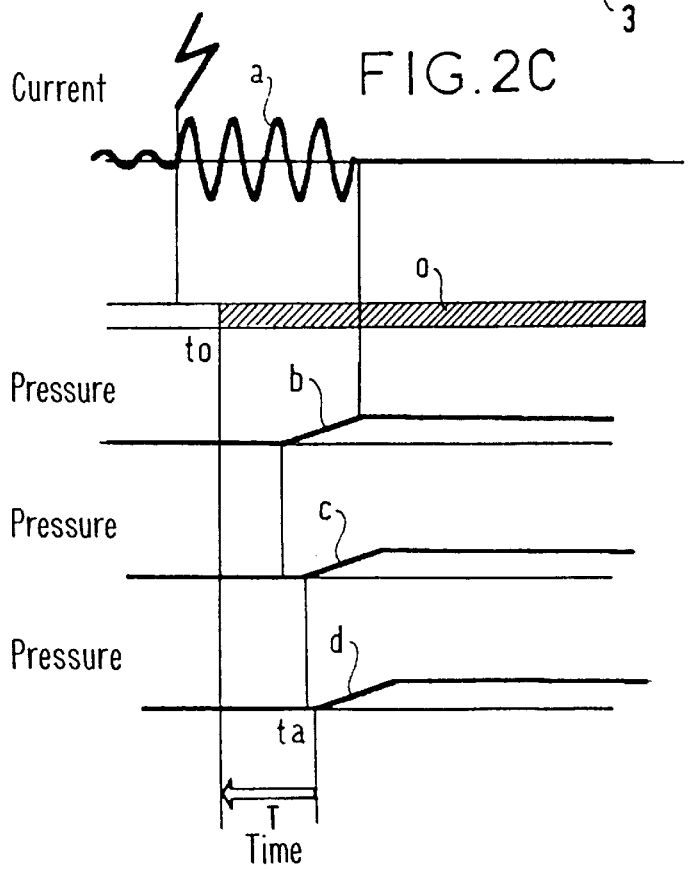
FIG. 2C is a time line showing the relevant timing between arc detection and circuit breaker triggering, thereby defining a negative time delay according to an embodiment of the present invention.

In FIGS. 2A to 2C, an internal arc 7' appears outside the circuit breaker 2 and is therefore not detected by the sensor 8. However, the fault current a is detected by the protective system 4 which transmits a circuit breaker trigger order o to the computer 5 at instant $t_o$.

The contacts of the circuit breaker 2 are separated as shown in FIG. 2B and an interruption arc 9 of short circuit current causes a pressure rise b which propagates after a first delay to the sensor 8. This first delay due to the distance between the interruption chamber and the sensor 8 is shown at c. This pressure increase is amplified by a pressure wave generated by the movement of the contacts.

The pressure rise front is then transmitted with a second delay to the computer 5, as described above, and it is acquired by the computer at instant $t_a$.

The time lapse $T=t_o-t_a$ is negative and greater in absolute value than the time between receiving the circuit breaker trigger order and the contacts separating, which is about 20 ms.

It should be observed that in both of the cases shown in the above figures, the decision criteria can be determined directly by the computer 5.

FIGS. 3A to 3D show a third case corresponding to the appearance of an internal arc in the circuit breaker following interruption of a short circuit current by the circuit breaker.

A fault current 10 appears on the line and is detected by the protective system 4 which sends a trigger order o to the computer 5 which receives it at instant $t_o$.

Figure 3A:
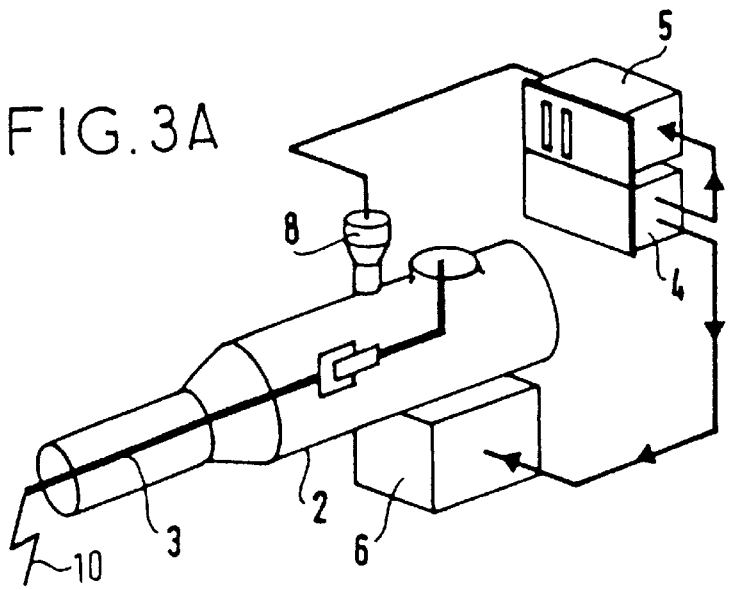
FIG. 3A is a perspective view of metal clad equipment with a fault current occurring on a line.
Figure 3B:
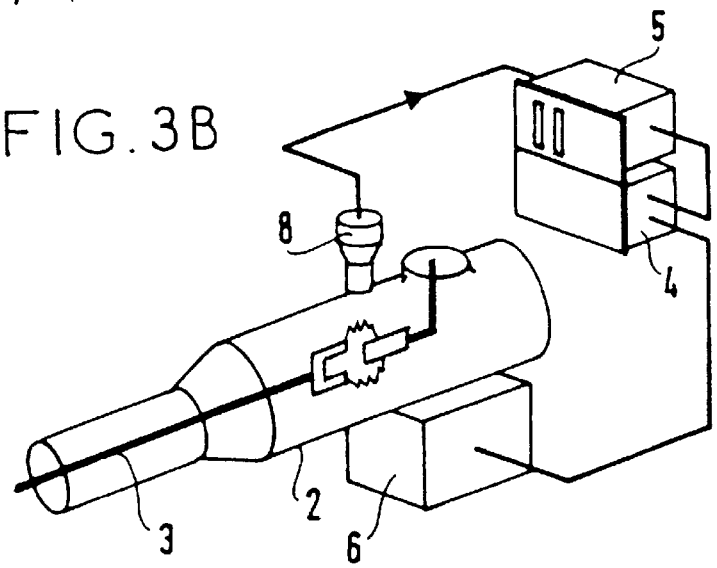
FIG. 3B is a perspective view of metal clad equipment with an interruption arc.
Figure 3C:
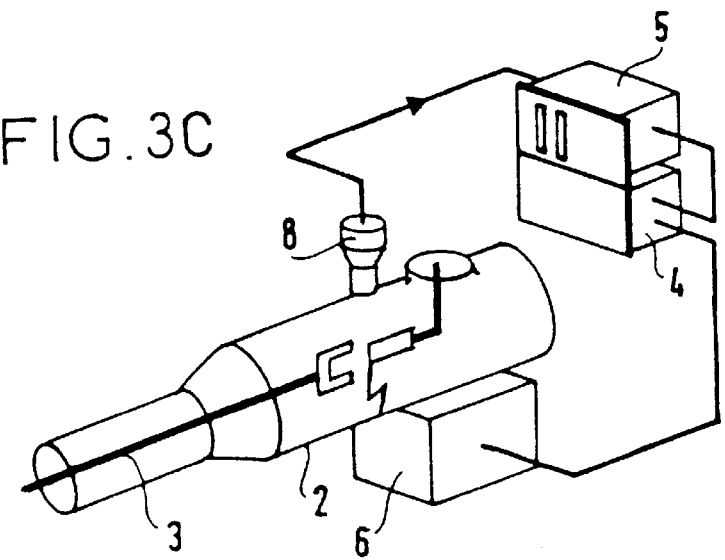
FIG. 3C is a perspective view of metal clad equipment with an internal arc occurring in a circuit breaker.
Figure 3D:
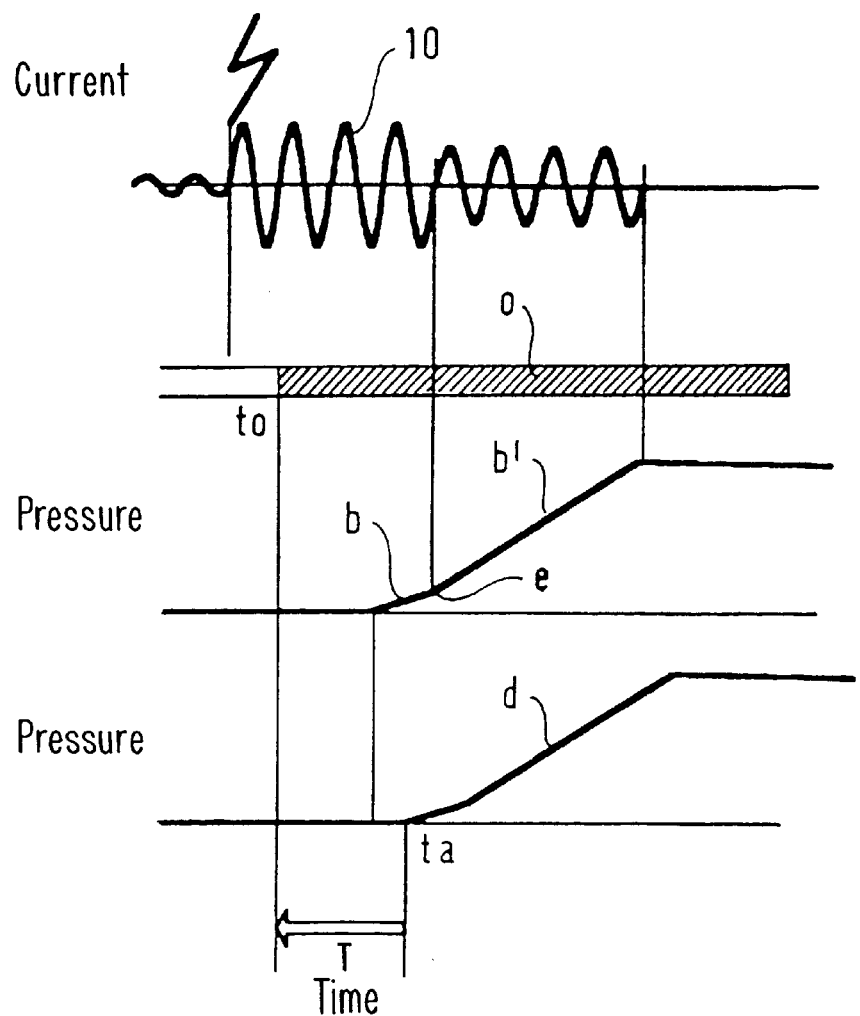
FIG. 3D is a time line showing the relevant timing between arc detection and circuit breaker triggering, thereby defining a negative time delay according to an embodiment of the present invention.

The contacts are separated as shown in FIG. 3B and the arc gives rise to a first pressure increase b as in the preceding case.

If an internal arc then appears in the circuit breaker 2, this first pressure rise front b is followed by a second pressure rise front b' having a steeper slope causing a "break" point e to be created.

These pressure rise fronts are transmitted to the sensor 8 and then to the computer 5 at instant $t_a$, as shown at d. As in the preceding case, $T=t_o-t_a$ is negative and greater in absolute value than the time between receiving the circuit breaker trigger order and the contacts separating, i.e. about 20 ms.

Consequently, when the time lapse T is negative and greater in absolute value to 10 ms, analysis of variation in the arc appearance signal is performed over 500 ms in order to determine whether it includes a break point within the 500 ms following the beginning of its acquisition. If that is the case, then there is an internal arc.

It should be observed that the above examples assume that the installation is fitted with a protective facility including a set of current transformers for protecting the line at the bus bar end and a set of current transformers for differential protection of the set of bus bars at the line end.

When both sets of transformers are situated at the line end, as happens when the bus bar section disconnectors are open, then it is remote protection that issues the circuit breaker trigger order by remote transmission and the order will be received by the computer after a delay of 250 ms to 500 ms. Such circumstances therefore give rise to a result similar to the previous example of so-called "slow" protection.

The method of the invention can be summed up by the following table:

|  |  | $T = t_o - t_a < 0$ |  |
|---|---|---|---|
|  |  | $\|T\| > 10$ ms |  |
| $T = t_o - t_a$ | $\|T\| \leq 10$ ms | Break point | No break point |
| Internal arc | Internal arc | Internal arc | No internal arc |

The above-described method can be associated with a second discrimination method in order to maximize reliability. The second method is described below.

When a short circuit current is interrupted by the circuit breaker 2, on separation of its contacts, an interruption arc is struck between them. If the circuit breaker 2 is operating properly, then the duration $T_1$ of an interruption arc is measurable and in practice is less than 30 ms. Otherwise, the protective system also includes other surveillance devices for monitoring proper interruption.

When an internal arc appears in the circuit breaker or in another compartment of the installation, the fault current is detected by the protective system 4, and then the circuit breaker trigger order is transmitted to the trigger facility 6 where the opening coil is actuated and causes the contacts of the circuit breaker 2 to separate. Between the appearance of the internal arc and its elimination by the circuit breaker 2 opening, there passes a measurable time lapse $T_2$ corresponding to the operating time plus the transmission time of the protective system 4. In practice, the transmission time of the protective system is about 10 ms and the operating time of the trigger facility 6 is about 50 ms, giving a total time lapse $T_2$ that is about 60 ms in practice.

The associated second method of the invention for discriminating between an internal arc and an interruption arc consists in detecting the appearance of an arc by means of the sensor 8 generating an arc-existence signal, in transmitting said signal to the computer 5, and in determining whether the duration of the signal is less than or greater than a predetermined limit value.

The limit value is selected to lie between $T_1$ and $T_2$, and is advantageously about 50 ms.

The detected arc is determined as being an interruption arc if the duration of the signal is less than said limit value, and the detected arc is determined as being an internal arc if the duration of the signal exceeds said limit value.

We claim:

1. A method of discriminating an arc detected in metal-clad equipment including a circuit breaker, and fitted with (1) a computer, and (2) a protective system for transmitting a trigger order to said circuit breaker and said computer, the method comprising the steps of:

detecting an arc;

generating an arc-appearance signal in response to said arc detection;

transmitting said arc-appearance signal to said computer;

determining a time lapse T according to the formula: $t_o - t_a$ wherein
   i. $t_o$ is an instant at which said computer receives said circuit breaker trigger order, and
   ii. $t_a$ is an instant at which said arc-appearance signal is first acquired by said computer; and discriminating said arc based on said time lapse T.

2. A method according to claim 1, further including the step of determining said arc to be an internal arc, if said time lapse T is positive.

3. A method according to claim 1, further including the step of determining said arc to be an internal arc, if said time lapse T is negative and its absolute value is less than or equal to 10 ms.

4. A method according to claim 1, further including the step of analyzing variation of said arc-appearance signal, if said time lapse T is negative and its absolute value is greater than 10 ms.

5. A method according to claim 4, further including the step of determining said arc to be an internal arc, if said arc-signal includes a break point within 500 ms following a start of its acquisition by said computer.

6. A method according to claim 4, further including the step of determining said arc to be an interruption arc, if said arc-signal does not have a break point within 500 ms following a start of its acquisition by said computer.

* * * * *